United States Patent [19]

Adams

[11] Patent Number: 4,662,971

[45] Date of Patent: May 5, 1987

[54] LABEL ASSEMBLY WITH VERIFYING MEANS AND METHOD OF MAKING AND USING

[75] Inventor: Samuel G. Adams, Buffalo, N.Y.

[73] Assignee: Bristol-Myers Company, New York, N.Y.

[21] Appl. No.: 801,264

[22] Filed: Nov. 25, 1985

Related U.S. Application Data

[62] Division of Ser. No. 732,976, May 13, 1985, Pat. No. 4,585,254.

[51] Int. Cl.[4] .......................... B32B 3/16; B32B 31/18

[52] U.S. Cl. .................................... 156/270; 40/2 R; 156/248; 156/267; 156/277; 156/DIG. 46; 428/42

[58] Field of Search ................. 156/64, 267, 270, 277, 156/248, 379, 384, 388, DIG. 46; 40/2 R; 283/81; 428/42; 356/71

[56] References Cited

U.S. PATENT DOCUMENTS

| | | | |
|---|---|---|---|
| 2,551,364 | 5/1951 | Coakley | 156/DIG. 46 |
| 3,607,537 | 9/1971 | Von Hofe | 156/277 |
| 3,711,353 | 1/1973 | Zimmer | 156/267 |
| 4,372,681 | 2/1983 | Sallenbach | 428/42 |
| 4,523,776 | 6/1985 | Barber | 283/81 |
| 4,526,405 | 7/1985 | Hattemer | 428/42 |

*Primary Examiner*—Michael Wityshyn

*Attorney, Agent, or Firm*—David M. Morse

[57] ABSTRACT

A label assembly includes machine readable indicia on the underside of the backing strip for verifying correspondence between identifying indicia on the label and the contents of a container before and/or during and/or after labeling of the container and is made by feeding a label layer/backing layer laminate web along a travel path and printing machine readable indicia on the underside of the backing layer and printing identifying indicia on the label layer.

4 Claims, 5 Drawing Figures

LABEL ASSEMBLY WITH VERIFYING MEANS AND METHOD OF MAKING AND USING

CROSS-REFERENCE TO RELATED APPLICATION

This application is a divisional of our prior copending application Ser. No. 732,976, filed May 13, 1985 now U.S. Pat. No. 4,585,254.

TECHNICAL FIELD

This invention is directed to a label assembly including machine readable indicia for verifying correspondence between identifiying indicia on the label and the contents of the container.

BACKGROUND OF THE INVENTION

In the labeling of containers, there is risk that the wrong label will be applied to a container. In other words, there is risk that a container will be mislabeled. This can happen, for example, if the wrong labels are fed by mistake or negligence to the labeling machine.

This is an important problem for manufacturers of pharmaceuticals and it has become conventional in this field, and in other fields where mislabeling can be dangerous, to provide safeguards to minimize the possibility of mislabeling. In conventional practice, this is carried out by including on the label itself a bar code representing the contents denoted by the label, optically scanning the pattern of the bar code as the label is being applied and comparing the reading to that which should represent the contents of the container, and automatically stopping the labeler responsive to any difference.

However, because of copy requirements, label size and/or aesthetics, some labels cannot accommodate a bar code. Consideration has been given to this problem. Sallenbach U.S. Pat. No. 4,372,681 solves this problem by including the bar code on a separate strip mounted on the same side of the backing strip as the label. This is disadvantageous in that additional material is required for the separate strip. Coakley U.S. Pat. No. 2,551,364 discloses printing the code on a tab or extension of the label which is cut off or otherwise removed after the label passes the verifying device. Von Hofe U.S. Pat. No. 3,607,537 also depicts tab extensions of a label bearing verifying indicia. These require extra label material than would otherwise be used.

SUMMARY OF THE INVENTION

It has been discovered herein that the problem of providing verification indicia when such cannot be imprinted on the label can be solved without the requirement of extra material simply by printing the bar code on the dorsal surface of the backing strip, i.e. the surface of the backing strip opposite that on which the label is mounted.

Thus, herein there is provided a label assembly including machine readable indicia for use in verifying correspondence between identifying indicia on the label and the contents of a container before and/or during and/or after labeling of the container; this label assembly comprises (a) a backing strip having a release coated surface for carrying labels and machine readable indicia on the opposite surface, and (b) labels, each having adhesive on one surface and releasably adhered thereby to said release coated surface of the backing strip and each having the opposite surface bearing indicia identifying the contents of the container to which the label is to be applied.

The label assembly herein is made by a preferred process comprising the steps of (a) feeding along a travel path a web comprising a laminate of label layer releasably and adhesively adhered to a backing layer, (b) printing machine readable indicia on the exposed surface of the backing layer (i.e. the surface opposite that to which label layer is adhered) and printing identifying indicia on the exposed surface of the label layer (i.e. the surface opposite that which is adhered to the backing layer), and (c) die cutting the label layer to define labels.

In use of the label assembly, correspondence between identifying indicia on a label and the contents of the container to which the label is to be applied is subjected to examination for verification by machine reading the indicia on the backing strip, e.g. on receipt of the label from the printers and/or as the label assembly is fed into the label applicator, and comparing the reading to a code assigned to the contents of the container.

The term container as used herein includes bottles, vials, ampuls and other containers used for pharmaceutical products or the like which normally bear labels identifying and/or describing the contents.

DESCRIPTION OF THE DRAWINGS

Preferred embodiments are illustrated in the figures of the drawings, in which.

DETAILED DESCRIPTION

Figure 1:
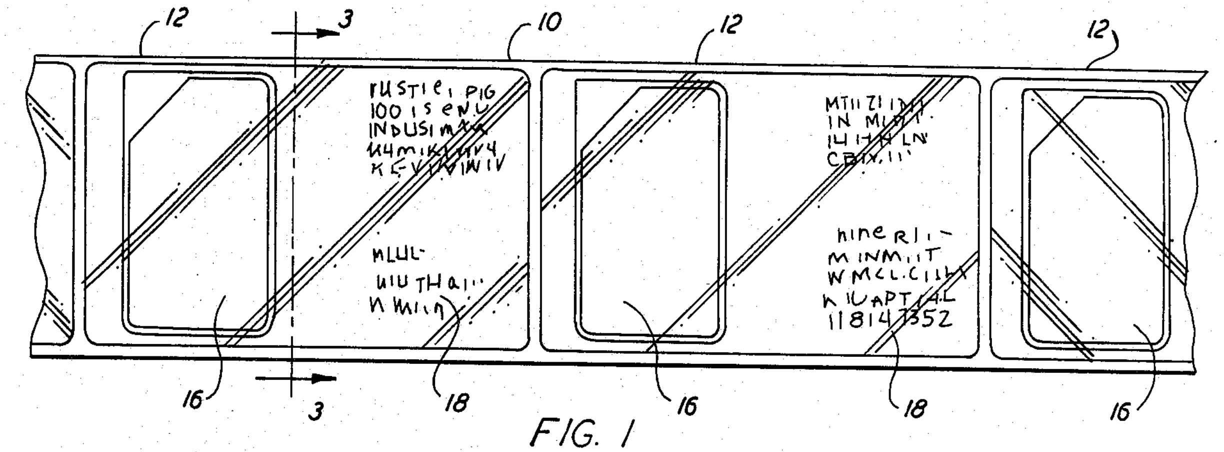
FIG. 1 is a top plan view of a label assembly herein.
Figure 2:
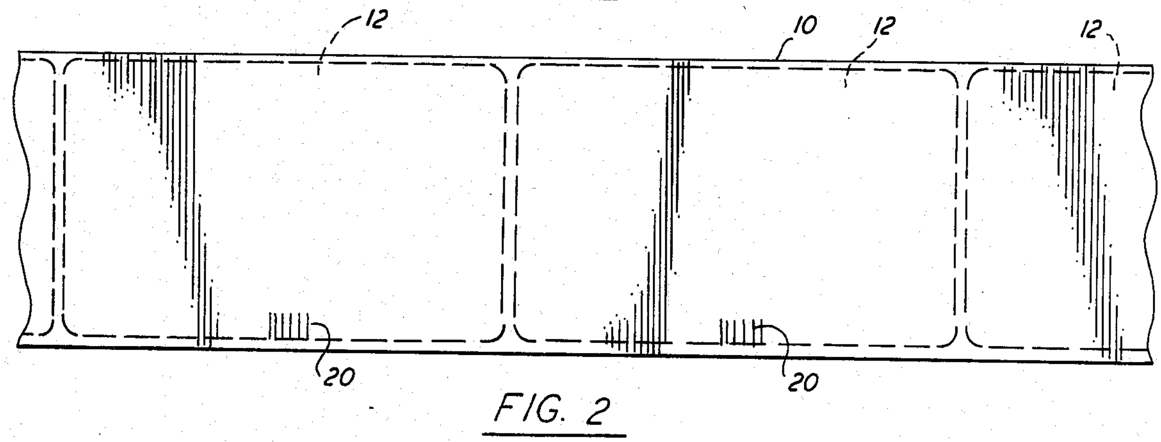
FIG. 2 is a bottom view of the label assembly of FIG. 1.
Figure 3:
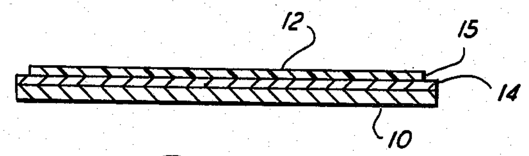
FIG. 3 is a vertical sectional view of the label assembly taken on line 3—3 of FIG. 1.

Referring to FIGS. 1-3, there is depicted a label assembly including a backing strip 10 on which are mounted a succession of labels 12 which are spaced from one another.

As depicted in FIG. 3 the backing strip 10 has a release coating 14, and the labels 12 are releasably adhered thereto by an adhesive layer 15.

The labels 12 can be any of the materials well known in the art for this purpose, e.g. 60 pound high gloss (wax coated) paper or smudgeproof lithograph paper (close fiber sheet) or other label quality paper, or durable, scuff and tear resistant polyester, such as Mylar, or high density polyethylene.

FIGS. 1-3 depict the labels 12 as each have a width just slightly smaller than that of the backing strip 10 thereby conserving backing strip material but not leaving sufficient room on the label layer side of the backing strip for bar code indicia.

Each label 12 carries trade designation identifying indicia 16 and optionally a list of contents and directions for use 18.

The adhesive layer 15 which is secured to the lower surface of each label 12 is used to secure the label to the container to which it is applied. The adhesive layer 15 is preferably of the pressure sensitive type and very preferably is of the non-yellowing acrylic type (especially where transparent label material or a transparent container are used) or of the rubber based type (especially where opaque label material is utilized). Less preferably adhesives of the solvent or emulsion type can be used.

The backing strip 10 can be of conventional release sheet material, e.g. 40 or 50 or 60 pound bleached or unbleached kraft paper coated with release coating 14, e.g. of silicone. Luxury product backing is readily made of plastic material, e.g. polyester.

The underside of the backing strip 10 carries machine readable indicia in the form of bar code indicia 20 having its bar components preferably positioned as depicted in FIG. 3, i.e. perpendicular to a longitudinal edge of the backing strip and near said edge (e.g. at least 2 mm from said edge and entirely within about 10 mm of said edge) and entirely underlying and longitudinally centered with respect to the label which is applied to the upper surface of the backing strip. The bar code represents a number corresponding to the product identifying indicia on the label and selected to correspond to the contents of the container to which the label is to be applied.

Figure 4:
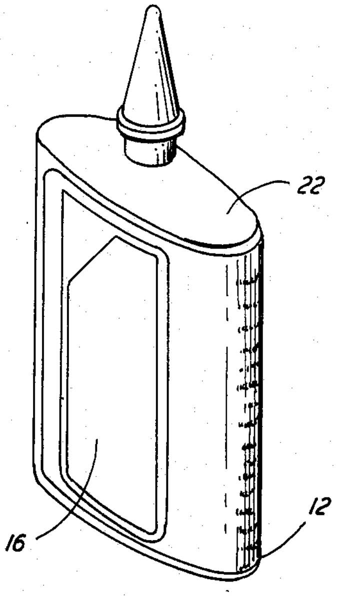
FIG. 4 is a perspective view of a container to which a label of the type depicted in FIGS. 1-3 has been applied.

FIG. 4 depicts a label 12 in place on a container 22 with the portion bearing trade designation 16 applied to the label panel at the front of container 22 and the portion bearing the list of ingredients (if such is present) and directions for use applied to the label panel at the back of container 22.

Turning now to a preferred process for making a preferred label assembly herein, the preferred starting material is a two layer laminate which is available in roll form which consists of a top layer suitable for label use and having adhesive on its underside and releasably attached to and coextensive with a second layer which is a release coated backing strip. Alternatively, instead of starting with purchased two layer laminate, the two layer laminate can be produced as an initial step in the label assembly making, for example, by separately purchasing rolls of release coated backing strip and of label material having one surface adhesive coated, and laminating by feeding webs from the two rolls to a laminating station where the two webs are pressed together between pressure rolls to form the laminate.

Figure 5:
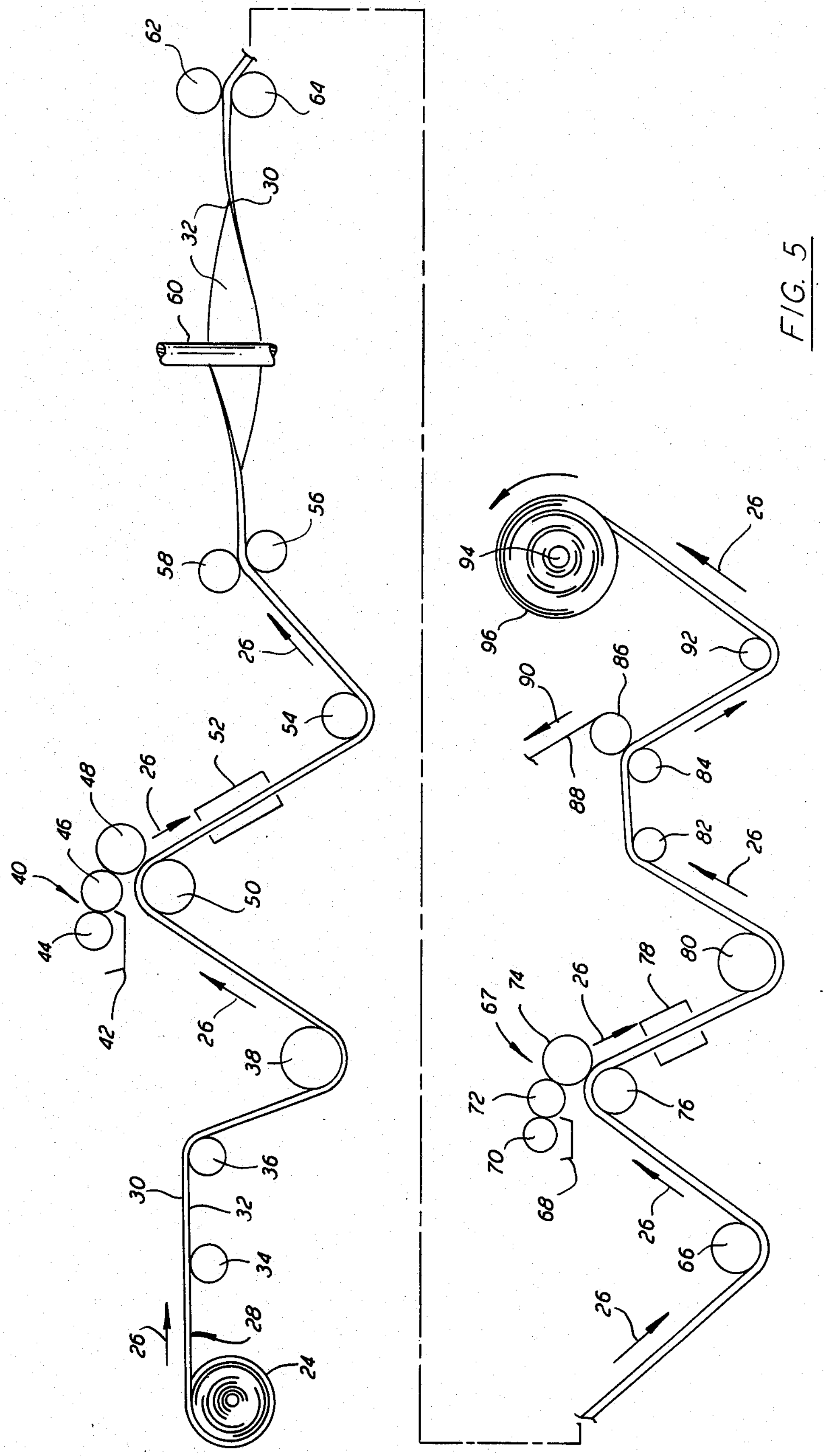
FIG. 5 is a schematic side elevational view of a preferred process for making the label assembly of FIGS. 1-3.

A preferred process for making a preferred label assembly herein is depicted in FIG. 5. With continuing reference to FIG. 5, purchased two layer laminate as described above is fed as a continuous web 28 from a roll 24 along a travel path as denoted by arrows 26. The web 28 is depicted as having thickness for purposes of description later in the process and has a surface 30 which starts out as the upper surface and represents the bottom (exposed surface) of the backing layer and a surface 32 which starts out as the lower surface and represents the top (exposed surface) of the label layer. The web passes over rolls 34 and 36 and then under guide roll 38 and then through printing station 40 where printing is preferably carried out flexographically using printing means including an ink reservoir 42, an ink roll 44, an anilox roll 46, a print cylinder 48 and a drive roll and impression cylinder 50. On passing between cylinders 48 and 50, the web 28 is printed on the exposed surface of the backing layer with bar code indicia. The web 28 then follows a downwardly inclined travel path through dryer 52 where the ink printed thereon is dried. The web 28 then passes under roller 54 and then follows an upwardly inclined travel path between retention rolls 56 and 58 and then passes over turning bar 60 whereby the web is turned over so that surface 30 (the exposed surface of the backing layer) is now on the bottom and the surface 32 (the exposed surface of the label layer) is now on the top. The web 28 then passes between retention and driving rolls 62 and 64 and then follows a downwardly inclined path under guide roller 66 and then is passed through a printing station 67. At station 67 printing is preferably carried out flexographically by printing means including an ink reservoir 68, an ink roll 70, an anilox roll 72, a print cylinder 74 and a drive roll and impression cylinder 76. On passing between cylinders 74 and 76, the web 28 is printed on the exposed surface of the label layer with trade designation indicia and optionally with directions for use and a list of ingredients. The web then follows a downwardly inclined path through a dryer 78 where the ink printed at station 67 is dried. The web then passes under guide roller 80 and then follows an upwardly inclined path and passes over idler roller 82. The web then follows a horizontal path and enters the nip between die cutting roll 86 and anvil roll 84 where die cutting is carried out to define the borders of the labels and to define also a matrix of scrap label layer which looks like a ladder and is referred to as ladder scrap. The ladder scrap 88 is separated from the web and is passed along a travel path 90 to a take-up reel (not depicted) and is eventually disposed to waste. The printed web which is finished label assembly of the invention herein is passed under guide roll 92 and then is passed to take-up reel 94 where it is assembled in roll form 96 for use.

The label assembly herein is readily verified upon receipt from the label assembly making process or on receipt from a supplier. This is readily carried out as follows. A scanner operator keys the assigned code (i.e. the code assigned to the contents of the container to which the label is to be applied) into the scanner whereby the optical eye is programmed to read the code. Then the operator threads the label assembly to be verified into the scanner. If the code on the assembly is different from that programmed, the optical eye refuses to read the code indicating lack of verification. If the code on the assembly is the same as that programmed into the scanner, the optical eye reads the code thereby indicating verification.

Turning now to the on line use and verification of the label assembly herein, it is fed , preferably as a web, into a label applicator (i.e. a labeler), e.g. one equipped with a peeling blade which separates the labels one by one from the backing strip and a vacuum pickup head which grasps a separated label and applies it to a container. As the label assembly web is fed into the labeler it passes by an optical pattern scanner which is associated with comparator and computer means and means to stop the labeler. The optical pattern scanner reads the bar code on the underside of the backing strip and sends a signal corresponding to the bar code to the comparator element into which has been programmed via the computer element the number corresponding to the contents of the container. The comparator element compares the bar code reading by the scanner with the programmed number and if there is a mismatch sends a signal to microswitch means to shut off the power to the labeler. Alternatively, a mismatch signal generated by the comparator element can be used to close the vacuum line to the label applicator head whereby the label applicator cannot pick up the incorrect label. Label applicators have long been well known in the art. Suitable label applicators include, for example, those available from Avery International under the designations Avery Primeline Serial No. 402808 or Avery Universal II F/B; and Serial No. 1072 EX available from Labeline Machine Systems. Other suitable label applicators are the Rotary Labeler, the Security Seal Labeler and the Series 3000 Labeler available from Labeling Systems Inc.

It is possible with the label assembly herein to reverify the correctness of the label after it has been applied to the container. This is readily carried out the same way as verifying before application of the label except that the backing sheet only (the label having been removed therefrom) is threaded into the scanner and the code still thereon is read indicating verification (if the same as the preprogrammed code) or lack of verification (if different from the preprogrammed code).

Optical scanners including comparator elements for functioning as disclosed have long well been known in the art; see Coakley U.S. Pat. No. 2,551,364. A suitable scanner is available from Weber Equipment under the designation Arpeco Inspector Serial No. WO 17-01-77. In practice, it is preferred to use the same optical scanner/comparator as is used for label verification when the bar code is on the label. Such use is readily carried out with the label assembly herein, e.g. by positioning the scanning eye on the opposite side of the label assembly web from where it is positioned when used with label assembly web with bar code on the label or by winding the label roll in a direction opposite to normal (i.e. winding the label in instead of winding the label out).

While the foregoing describes preferred embodiments, modifications within the scope of the invention will be evident to those skilled in the art.

For example, machine readable indicia besides bar codes can be utilized, such as digital indicia. Moreover, the bar codes, while preferably perpendicular to a longitudinal edge of the web and near it, can be located anywhere on the underside of the backing strip (one in conjunction with each label), e.g. centered on the web and perpendicular to or aligned with a longitudinal edge or in any other position for reading by the scanner; the important point is that the bar codes must be consistently placed in the same position in respect to a particular run so as to be aligned with the scanner.

Thus, the scope of the invention is intended to be defined by the claims.

What is claimed is:

1. Method for making a label assembly including machine readable indicia for use in verifying correspondence between identifying indicia on the label and the contents of a container to which the label is to be applied, said method comprising the steps of (a) feeding along a travel path a web comprising a laminate of label layer releasably and adhesively adhered to a backing layer, (b) printing machine readable indicia on the exposed surface of the backing layer and printing identifying indicia on the exposed surface of the label layer, and (c) die cutting the label layer to define labels.

2. Method as recited in claim 1 wherein printing on the backing layer is carried out prior to printing on the label layer.

3. Method as recited in claim 2 wherein the web is turned over between printing steps so both printing steps are carried out on top of the web.

4. Method as recited in claim 3 wherein the turning is accomplished using a turning bar.

* * * * *